United States Patent [19]

Buhayar

[11] Patent Number: 4,491,045

[45] Date of Patent: Jan. 1, 1985

[54] ROTARY CUTTER FOR THIN, FLEXIBLE WEBS

[75] Inventor: Eric S. Buhayar, Swarthmore, Pa.

[73] Assignee: Scott Paper Company, Philadelphia, Pa.

[21] Appl. No.: 485,565

[22] Filed: Apr. 15, 1983

[51] Int. Cl.[3] .............................................. B23D 25/12

[52] U.S. Cl. ......................................... 83/341; 83/343; 83/345; 83/678; 83/674

[58] Field of Search ................. 83/341, 343, 345, 678, 83/674, 331, 344

[56] References Cited

U.S. PATENT DOCUMENTS

| | | | |
|---|---|---|---|
| 1,398,474 | 11/1921 | Strawn | 83/341 X |
| 2,568,333 | 9/1951 | Henschker | 83/341 |
| 3,000,250 | 9/1961 | Altmann et al. | 83/341 |
| 3,086,416 | 4/1963 | Minarik | 83/678 X |
| 3,828,636 | 8/1974 | Smith | 83/341 |

*Primary Examiner*—Donald R. Schran

[57] ABSTRACT

A rotary cutter or scissors for cutting a flexible web material as it travels around a rotating anvil roll. Mounted in the periphery of the anvil roll is an anvil blade having a cutting edge generally extending across the roll. Mounted in a fly knife roll rotating in synchronism with the anvil roll is a fly knife blade having a cutting edge that is also generally in axial alignment near the periphery of the fly knife roll. The axes of the anvil roll and the fly knife roll lie in the same plane and are spaced so that the locus of a cutting point on the fly knife blade intersects the locus of a corresponding cutting point on the anvil blade at two points, the first intersection point occurring as the cutting point on the fly knife blade is approaching the center of the anvil roll and the second intersection point occurring as the cutting point on the fly knife blade is traveling away from the center of the anvil roll. The anvil blade and the fly knife blade are mounted in their respective rolls so that the flexible web traveling on the surface of the anvil roll is cut through the cooperation of the cutting point on the fly knife blade with the corresponding cutting point on the anvil blade as the cutting point on the fly knife blade is traveling away from the center of the bed roll.

4 Claims, 7 Drawing Figures

ROTARY CUTTER FOR THIN, FLEXIBLE WEBS

TECHNICAL FIELD

This invention relates generally to the field of rotary cutters or scissors and more particularly to rotary cutters in which a thin, flexible web material, such as paper, is cut as it travels around the periphery of a roll.

BACKGROUND ART

Rotary cutters for cutting various materials are well known in the prior art. For example U.S. Pat. No. 2,568,333—Henschker et al discloses a rotary cutter for cutting a moving metal strip. Henschker et al is concerned with the orientation of the cutting blade so as to obtain a square cut. U.S. Pat. No. 3,410,162—Ruggeri discloses a rotary cutter for cutting patches of microfilm from a roll of film. Rotary scissors cutters have also been used in the prior art to cut individual napkins from a parent roll of napkins stock. Typical of such equipment is a napkin folder manufactured by Bretting Company.

Rotary scissors cutters employ two synchronously rotating rolls. Each roll can have mounted in it one or more knife blades. The mounting of the blades in each roll is such that the cutting edges come together with a scissor like cutting action which progresses down the blades across the width of the web being cut. The web to be cut typically wraps one of the rolls which can be referred to as the anvil roll. The cutting edges of the knife blades mounted in the anvil roll usually travel at the same velocity as the web. In order to have the web cut be perpendicular to the direction of travel of the web, the knife blades are mounted in the anvil roll so that their cutting edges are parallel to the roll axis and at a constant radius from the roll axis. The second roll, generally referred to as the fly knife roll, is usually coupled to the anvil roll with anti backlash gearing which also provides for phase adjustment between the two rolls. In order for the cutting edge of a fly knife blade to provide a progressive cutting action with the cutting edge of an anvil blade, the fly knife blade must be mounted in the fly knife roll so that its cutting edge is located at a gradually changing radius down the length of the fly knife roll and it must be appropriately skewed or warped in the circumferential direction to maintain cutting contact with the anvil blade.

It is also well known in the rotary scissor cutter art, that the distance between the center axis of the anvil roll and the center axis of the fly knife roll is less than the sum of the radius of the locus of the cutting edge of a fly knife blade and the radius of the locus of the cutting edge of an anvil blade. Because of this a point on the cutting edge of the fly knife blade intersects the locus of a point on the cutting edge of the anvil blade at two points. The first intersection occurs as the point on the cutting edge of the fly knife blade is traveling so as to have a component directed towards the center of the anvil roll and the second intersection occurs as the point on the fly knife cutting edge is traveling so as to have a component directed away from the center of the anvil roll. Although from a theoretical standpoint a material can be cut by synchronizing the rotation of the fly knife roll with respect to the anvil roll so that the cutting occurs at either the first intersection or the second intersection, it is believed that for practical considerations all prior art rotary cutters or scissors performed the cutting at the first intersection when the fly knife blade is approaching the center of the anvil roll. The reason for this belief is that in order to cut material at the second point of intersection, when the cutting edge of the fly knife blade is traveling away from the center of the anvil roll, the cutting edge of the fly knife blade will have had to push down upon and deflect the uncut material before making the cut at the second point of intesection. If the material being cut is metal as in the Henschker et al reference or microfilm as in the Ruggeri reference, the material will either be deformed or scuffed so as in all likelihood to be useless. It is also believed that those skilled in the art of applying rotary scissors to the cutting of thin flexible materials such as sanitary paper products, did not consider it practical to cut such materials at the second point of intersection when the cut could readily be accomplished at the first point of intersection as the cutting edge of the fly knife blade is traveling toward the center of the anvil roll.

SUMMARY OF THE INVENTION

This invention deals with a rotary cutter or scissors for cutting a flexible web material as it travels around a rotating anvil roll. Mounted in the periphery of the anvil roll is an anvil blade having a cutting edge generally extending across the roll. A rotary cutter also includes a fly knife roll rotating in synchronism with the anvil roll. Mounted in the fly knife roll is a fly knife blade having a cutting edge that is also generally in axial alignment near the periphery of the fly knife roll. The axes of the anvil roll and the fly knife roll lie in the same plane and are spaced so that the locus of a cutting point on the fly knife blade intersects the locus of a corresponding cutting point on the anvil blade at two points, the first intersection point occurring as the cutting point on the fly knife blade is approaching the center of the anvil roll and the second intersection point occurring as the cutting point on the fly knife blade is traveling away from the center of the anvil roll. The improvement of this invention comprises mounting the anvil blade and the fly knife blade in their respective rolls so that the flexible web traveling on the surface of the anvil roll is cut through the cooperation of the cutting point on the fly knife blade with the corresponding cutting point on the anvil blade as the cutting point on the fly knife blade is traveling away from the center of the bed roll. The improved rotary cutter of this invention can be used to cut the flexible web material into sheets or can be used to perforate the flexible web material. In one preferred embodiment, the anvil blade and the fly knife blade are mounted in their respective rolls so that they form a rotary scissor in which the cutting of the web progresses down the length of the rolls and across the width of the web being cut.

One advantage of cutting a web at the second point of intersection can be realized by comparing the forces acting on the fly knife blade in the two cases.

The forces between the two cutting edges which are needed to cut the flexible web are induced by the reaction of the fly knife blade as it is caused to interfere with the anvil blade. The fly knife blade has a width typically just over one inch, part of which is held in a holder and the remaining cantilevered portion terminates with the cutting edge. The fly knife thickness, typically one sixteenth of an inch, yields appropriate cutting forces when cammed aside because of the aforementioned interference with the anvil blade. These camming forces have two components, the first of which is directed along the line joining the instantaneous centers of curvature of the minute radii formed on the cutting edges of the anvil blade and the fly knife blade; the second is a friction drag force which is perpendicular to the first. The resultant of these two forces acting on the fly knife can be resolved into components acting along and perpendicular to its width.

When cutting occurs at the first point of intersection, as the fly knife blade is approaching the center of the anvil roll, the major force component is that acting along the width of the blade and the perpendicular component causing cantilever bending of the blade is small and much dependent on the magnitude of the friction drag which can be very variable. The use of a lubricant is almost mandatory because of this.

When cutting occurs at the second point of intersection, as the cutting edge of the fly knife blade is traveling away from the center of the anvil roll, it is possible to configure the fly knife blade and its holding means so that the perpendicular component is the large one. This leads to a system which cuts the web with a less critical adjustment of the blade interference and one which is insensitive to friction drag.

Another advantage of cutting at the second intersection point is the fact that when a cut is made in accordance with the prior art by cutting at the first intersection point, it may be necessary to cut a special chamfer at one end of either the fly knife blade or the anvil blade in order to initiate the cammed scissoring action of the two blades. When the cut occurs at the second point of intersection as the cutting edge of the fly knife blade is traveling away from the center of the anvil roll, it is not necessary to modify either cutting blade in order to initiate the scissor action of the blades.

BRIEF DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

BEST MODE FOR CARRYING OUT THE INVENTION

For the sake of convenience, certain elements described with reference to a specific figure will retain the same reference designation in the description of subsequent figures.

Figure 1:
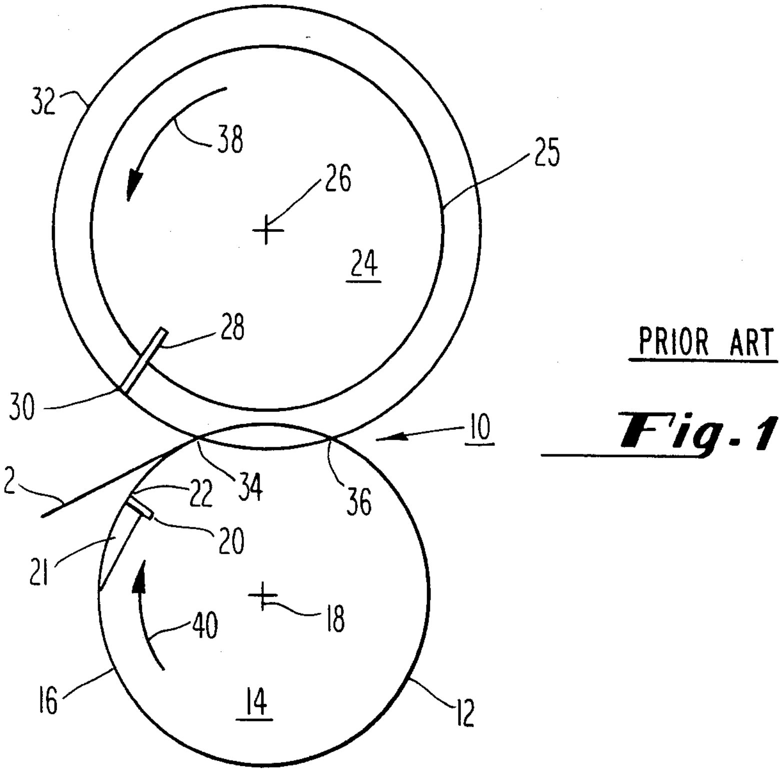
PRIOR ART Fig. 1
FIG. 1 is a schematic representation of a typical prior art rotary cutter.

FIG. 1 depicts in schematic form a typical prior art rotary cutter or scissor. A web material 12 is directed onto the surface 16 of an anvil roll (sometimes also called a bed roll) 14 rotating about a central axis 18. Mounted in the anvil roll 14 is an anvil blade 20 having its cutting edge 22 at or just below the surface 16 of the anvil roll 14. The rotary cutter or scissor 10 includes a fly knife roll 24 rotating about a central axis 26. Mounted within the fly knife roll 24 is a fly knife blade 28 having a cutting edge 30 that projects beyond the surface 25 of the fly knife roll 24. The anvil roll 14 rotates in a clockwise direction as indicated by arrow 40 and the fly knife roll 24 rotates in a counter clockwise direction as indicated by the arrow 38. For ease of explanation, assume that the anvil blade 20 is mounted so that the locus described by its cutting edge 22 as the anvil roll 14 rotates about its center axis 18 is a circle that coincides with the surface 16 of the anvil roll 14. The circle 32 represents the locus of the cutting edge 30 of fly knife blade 28 as the fly knife roll 24 rotates about its center axis 26. The locus of a point on the cutting edge 30 of fly knife blade 28 intersects the locus of a point on the cutting edge 22 of anvil blade 20 at a first intersection point 34 and at a second intersection point 36. When the anvil blade 20 is located with respect to the fly knife blade 28, as shown in FIG. 1, the web material 12 will be cut when the cutting edge 22 of the anvil blade 20 meets the cutting edge 30 of fly knife blade 28 at the first intersection point 34.

The anvil roll 14 and the fly knife roll 24 are geared together (by means not shown) so that their rotation is synchronized. In addition it is well known in the prior art that the gearing include antibacklash means (also not shown) so that backlash between the anvil roll 14 and the fly knife roll 24 is minimized when the anvil blade 20 and the fly knife blade 28 are at the cutting point 34.

This invention differs from the prior art in that the anvil roll 14 and the fly knife roll 24 are synchronized so that the cutting edge 22 of the anvil blade 20 coacts with the cutting edge 30 of the fly knife blade 28 to cut the web at the second intersection point 36 of FIG. 1.

Figure 2:
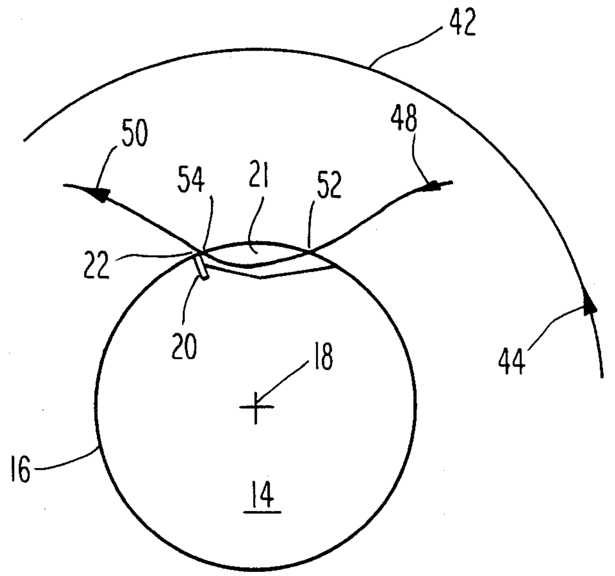
FIG. 2 represents the relative motion of a point on the cutting edge of a fly knife blade with respect to a corresponding point on the cutting edge of the anvil blade.

It is difficult to perceive the relative motion of the cutting edge 30 of the fly knife blade 28 with respect to the cutting edge 22 of the anvil blade 20 from the representation of FIG. 1 in which the anvil blade 20 is depicted as rotating about the center axis 18 of anvil roll 14 and the fly knife blade 28 is depicted as rotating about the central axis 26 of fly knife roll 24. A better understanding of the advantages of this invention will be obtained if the anvil roll 14 is considered to be stationary while the roll 24, being geared to the anvil roll 14, travels in an orbit around the center axis 18 of anvil roll 14. The relative motion of a point on the cutting edge 30 of the fly knife blade 28 with respect to a point on the cutting edge 22 on the anvil blade 20 is that illustrated in FIGS. 2 and 3. FIG. 2 shows that relative path 46 of a point on the cutting edge 30 of fly knife blade 28 when the cutting edge 30 lies inside the pitch circle of the gear (not shown) of the fly knife roll 24. As shown in FIG. 2, the central axis 26 of the fly knife roll 24 describes a circular pah 42 about the central axis 18 of the anvil roll 14 as it orbits clockwise, as indicated by arrowhead 44, about the anvil roll 14. If the cutting edge 30 of the fly knife blade 28 lies inside, that is closer to the central axis 18 of the anvil roll 14, the pitch circle of the gear (not shown) of the fly knife roll 24, the path 46 described by the cutting edge 30 is a curtate epitrochoid. If the circle 16 represents the locus of points on the cutting edge 22 of the anvil blade 20 for any orientation of the anvil roll 14, it can be seen that the cutting path 48 of the cutting edge 30 intersects the circle 16 at a first point 52, as the point on the cutting edge 30 is approaching the center axis 18 of the anvil roll 14, and then intersects the circle 16 at a second point 54 as it is traveling away from the central axis 18 of the anvil roll 14. It is believed that in all of the prior art rotary cutters or scissors, the anvil blade 20 is located so that the relative position of its cutting edge 22 cuts the web 12 at the point of the first intersection point 52 of FIG. 2.

Figure 3:
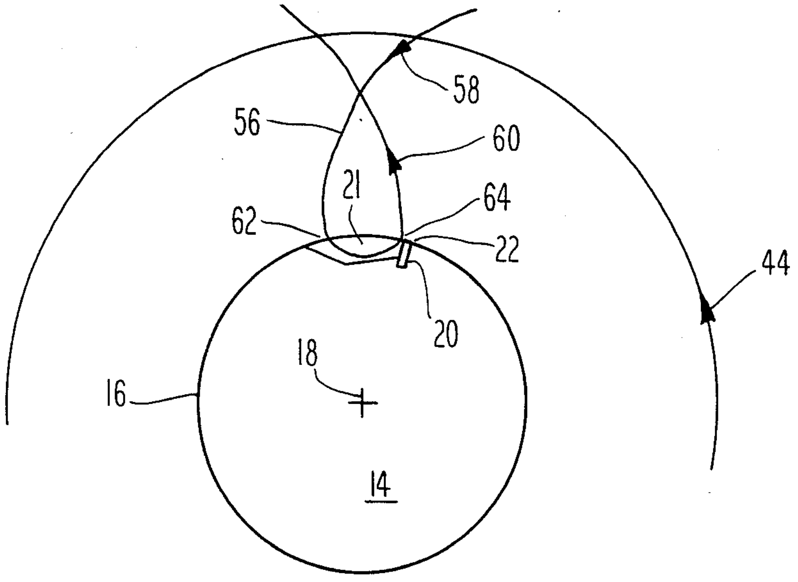
FIG. 3 also shows the relative motion of a point on the cutting edge of a fly knife blade with respect to a corresponding point on the cutting edge of the anvil blade.

FIG. 3 illustrates the path 56 of a point on the cutting edge 30 of fly knife blade 28 when the cutting edge 30 lies outside the pitch circle of the gear of the fly knife roll 24. This path 56 is a prolate epitrochoid. As indicated by the arrowhead 58, the cutting edge 30 of the fly knife blade 28 approaches the central axis 18 of the anvil roll 14 and first intersects the circle 16, representing the locus of a point on the cutting edge 22 of the anvil blade 20 for any orientation of the anvil roll 14, at a first intersection point 62. Then as the point on the cutting edge 30 of the fly knife blade 28 begins to move away from the central axis 18 of the anvil roll 14, it intersects the circle 16 at a second point 64. In accordance with this invention, the anvil blade 20 is located so that the web is cut when the relative position of its cutting edge 22 is at the second intersection point 64 whereas in the prior art, it is believed that the anvil blade 20 would be located so that the web is cut when the relative position of its cutting edge 22 is at the first intersection point 62.

Figure 4:
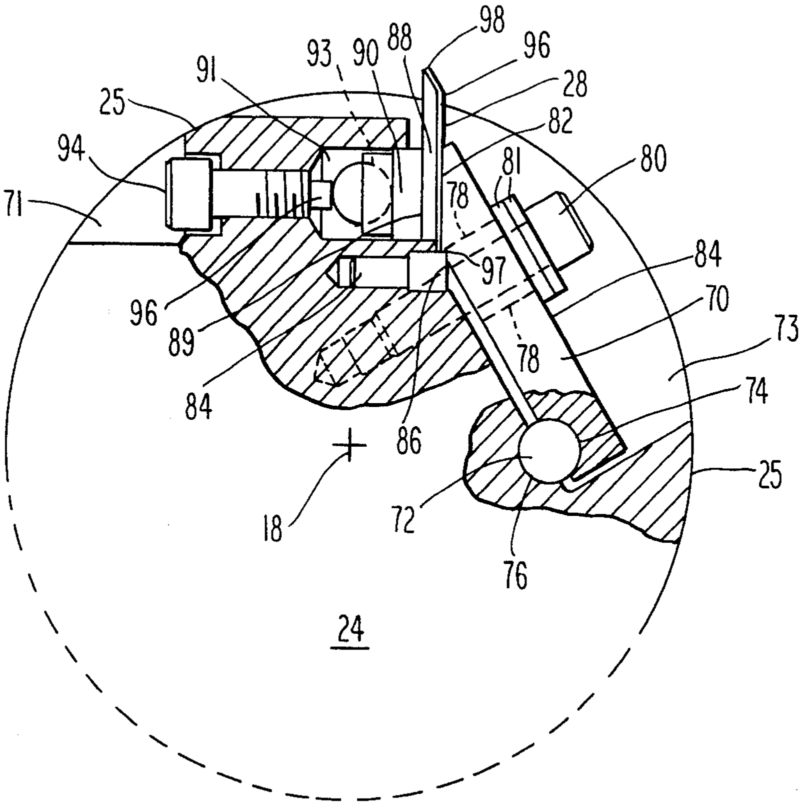
FIG. 4 shows an end view, partially in section, of a preferred means for clamping a fly knife blade.
Figure 5:
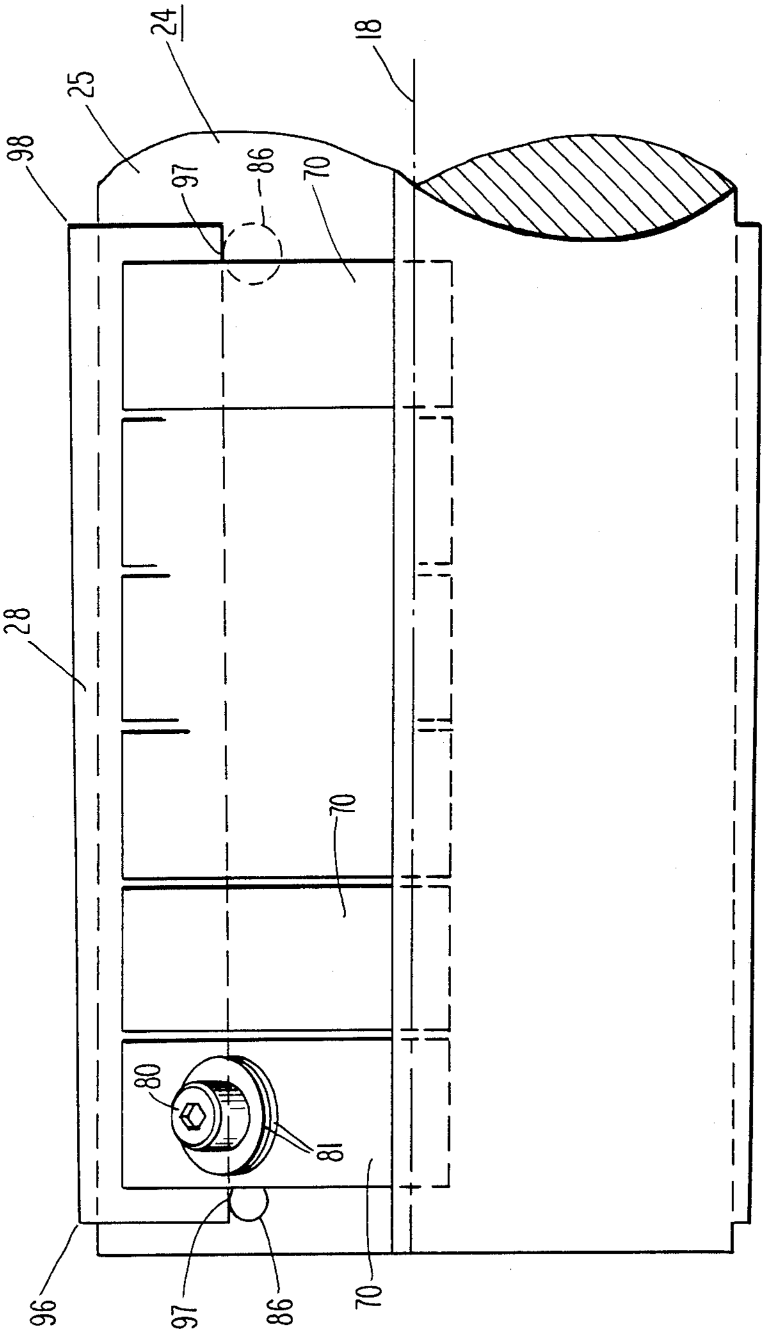
FIG. 5 is a side view of the clamp means illustrated in FIG. 4.

FIGS. 4 and 5 illustrate a preferred means for clamping a rectangular fly knife blade 28 in the fly knife roll 24. The blade 28 is mounted in the roll 24 so that one corner 98 of the blade 28 extends further from the surface 25 of the fly knife roll 24 than does the other corner 96 of the blade 28. The blade 28 is mounted in the fly knife roll 24 so that the inner edge 97 of the blade 28 rests against the heads 86 of two reference buttons 84. The diameters of the heads 86 of the reference buttons 84 determine the precise slope or cant of the cutting edge of the fly knife blade 28. The fly knife blade 28 is held within the fly knife roll 24 by six individually adjustable clamp assemblies, each clamp assembly being able to control the planar alignment of a segment of the fly knife blade 28. As shown in FIG. 4, portions 71, 73 of the fly knife roll 24 have been cut away so that all parts of the individual clamp assemblies will lie within the locus of the surface 25 of the fly knife roll 24. Each clamp assembly includes a clamp segment 70 which has a planar face 82 that contacts one surface of fly knife blade 28. At the other end of clamp segment 70, a ball 72 cooperates with a spherical cut out 74 in the clamp segment 70 and a spherical cut out 76 in the fly knife roll 24 to form a ball and socket joint. The clamp segment 70 includes a bearing surface 84 which forms an angle with the plane of the surface of the fly knife blade 28. The fly knife roll 24 is threaded to receive socket head cap screw 80 which passes through spherical washers 81 and through clearance hole 78 within clamp segment 70. The spherical washers 81 act to uniformly distribute the bolt forces on the bearing surface 84 even through the plane of bearing surface 84 is not perpendicular to the axis of the socket head cap screw 80. A clamping force is applied to the other surface of fly knife blade 28 by the planar face 89 of a plunger 90 which fits loosely within a cylindrical cavity 91 in the fly knife roll 24. The end of the plunger 90 opposite from the planar face 89 has a spherical cut out 93 adapted to receive a ball 92. The clamping force is provided by the end 96 of socket head cap screw 94 which applies pressure on ball 92 and plunger 90. Although the planar face 89 of plunger 90 could directly contact the surface of fly knife blade 28, it is preferred to employ a blade spacer 88 made of a softer material than either the planar face 89 of the plunger 90 or the fly knife blade 28. The blade spacer 88 prevents corrosion fretting fatigue of the working surfaces of the plunger 90 and the fly knife blade 28. In a preferred embodiment, the blade spacer 88 runs the entire length of the fly knife blade 28 in order to help distribute the clamping load more evenly along the blade 28, in particular over the discontinuity between adjacent clamped segments of blade 28. Because the diameter of the cylindrical cavity 91 is larger than the diameter of the plunger 90, and because the clamping force is provided through a ball 92 and socket arrangement, the plane of the face 89 of plunger 90 will align itself to match the plane of face 82 of clamp segment 70 as the clamping force is first applied by socket head cap screw 94.

Figure 6:
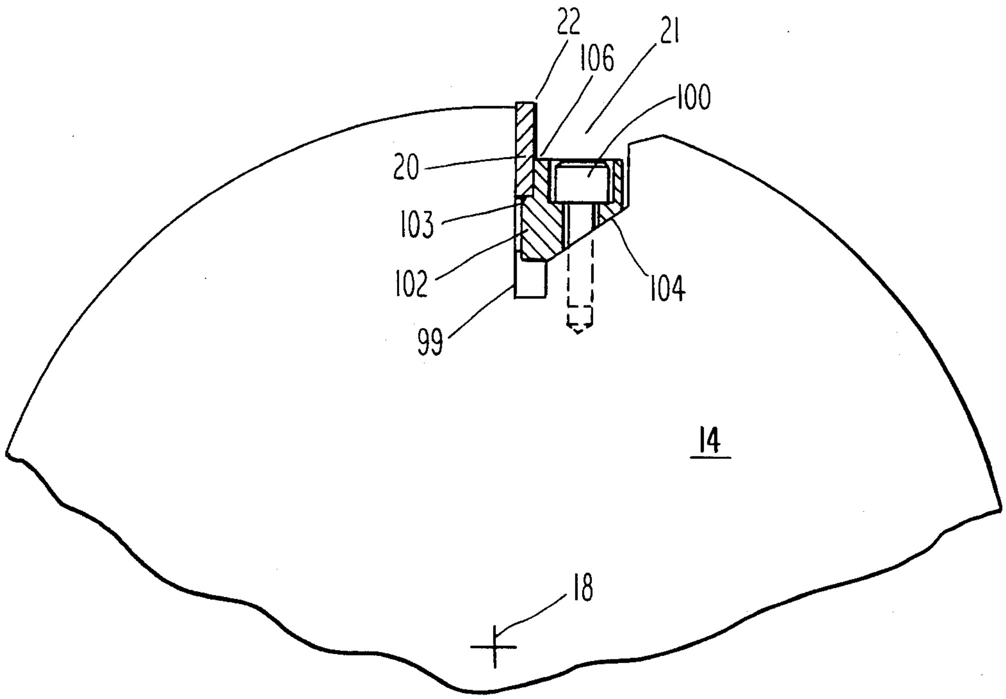
FIG. 6 is an end view, partially in section, illustrating a preferred means for mounting an anvil blade in the anvil roll.

FIG. 6 shows a preferred means for mounting an anvil blade 20 within an anvil roll 14. A cavity 21 is formed in the anvil roll 14. Within the cavity 21 is formed a side wall 99 against which one surface of anvil blade 20 will be clamped. The cavity 21 also includes a surface 104 that is inclined with respect to surface 99. A clamping force is applied to the anvil blade 20 by means of a clamp bar 102 that has an inclined surface that bears on inclined surface 104 within cavity 21. The clamp bar 102 is held within the cavity 21 by means of bolt 100. The holes in clamp bar 102 that receive the bolt 100 and the head of bolt 100 are drilled with sufficient clearance so that as bolt 100 is tightened, the surface 106 of clamp bar 102 bears laterally against the surface of anvil blade 20 thereby clamping it within the anvil roll 14. The clamp bar 102 also has a ledge 103 for locating the interior edge of anvil blade 20.

Figure 7:
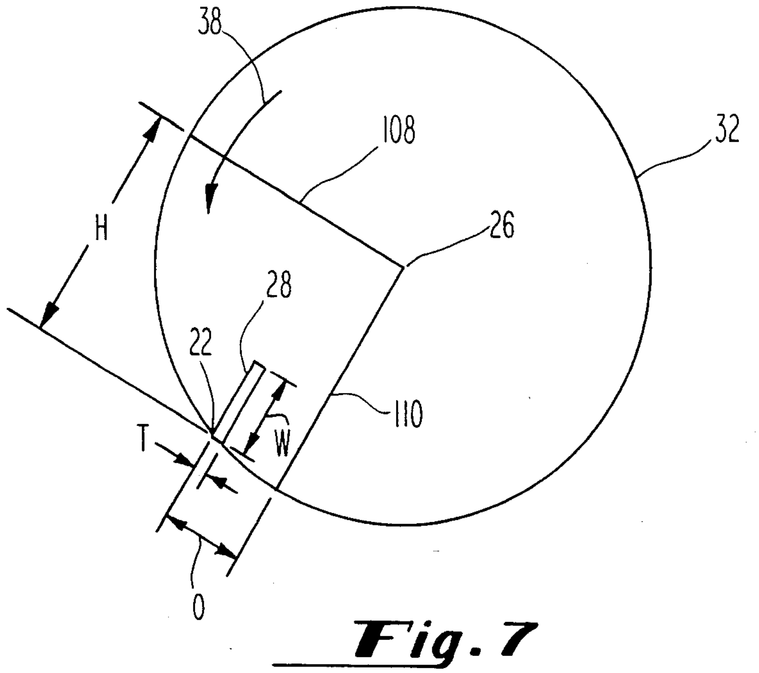
FIG. 7 is a schematic diagram defining parameters for describing how the fly knife blade is mounted in the fly knife roll.

Before describing in more detail one preferred mounting of a fly knife blade 28 within a fly knife roll 24 it will be useful to define several terms as illustrated in FIG. 7. FIG. 7 represents a cross section perpendicular to the axis 26 of the fly knife roll 24. The illustrated cross section of the fly knife blade 28 is shown with the small dimension identified by the letter T representing the thickness of the blade 28 and the larger dimension of the blade 28 indicated by the letter W representing the width of the blade. Line 110 is a radius of the fly knife roll 24 that is parallel to the direction of the width, W, of fly knife blade 28, and radius 108 is a radius of fly knife roll 24 that is perpendicular to the direction of the width, W, of fly knife blade 28. The distance from the cutting corner 22 of the fly knife blade 28 from radius 108 is designated by the letter H which will be called in this specification the height of the cutting corner 22. The distance of the cutting corner 22 from the radius 110 is indicated by the letter O, which in this specification will be called the offset of the cutting corner 22. As indicated by the arrow 38, the fly knife roll 24 is rotating in a counter clockwise direction. When the fly knife blade 28 lags the radius 106, as shown in FIG. 7, the offset, O, will be negative and if the fly knife blade 28 leads the radius 106, the offset, O will be positive.

Table 1 illustrates a preferred orientation of the cutting edge 22 of a fly knife blade 28 with respect to the cutting edge of an anvil blade 20 that has been designed for use in a rotary cutter in which the cut is performed as the cutting edge of the fly knife blade 28 is traveling away from the center 18 of the anvil roll 14. The gear ratio between the anvil roll 14 and the fly knife roll 24 is one-to-one. The radial distance from the center 18 of the anvil roll to the cutting corner of the anvil blade is 4.203 inches. The distance between the axis 18 of the anvil roll and axis 26 of the fly knife roll is 7.125 inches. The path of the cutting corner of the fly knife blade 28 is chosen to be a curtate epitrochoid as illustrated in FIG. 2. Table 1 gives the height, H, and offset, 10, coordinates of the blade at various points along the length of a fly knife blade 28. It is to be pointed out the heights of offsets shown in Table 1 are designed coordinates. When a new blade is installed in the fly knife roll 24, the clamp assemblies can be initially adjusted so that the cutting corner of the fly knife blade 28 very nearly has coordinates as shown in Table 1. However as in most rotary cutters it may be necessary to make slight adjustments in the individual clamp assemblies in order to provide a smooth continuous, progressive cutting action through the interaction of the fly knife blade 28 and anvil blade 20.

TABLE 1

| Distance along the fly knife blade (inches) | H Height (inches) | O Offset (inches) |
|---|---|---|
| 0 | 2.825 | −0.796 |
| 0.688 | 2.838 | −0.782 |
| 1.938 | 2.861 | −0,761 |
| 3.813 | 2.884 | −0.746 |
| 4.438 | 2.907 | −0.733 |
| 5.688 | 2.929 | −0.723 |
| 6.938 | 2.952 | −0.715 |
| 7.625 | 2.965 | −0.711 |

Although the example of Table 1 is for a rotary cutter in which there is progressive cutting action along the length of the blade, it will be apparent to those skilled in the art that cutting at the second point of intersection can be accomplished even if the cut were not progressive.

What is claimed is:

1. An improved rotary scissor for cutting a flexible web, the rotary scissor comprising a rotating anvil roll, an anvil blade axially mounted at the periphery of the anvil roll, a fly knife roll rotating in synchronism with the anvil roll, a fly knife blade mounted generally in axial alignment at the periphery of the fly knife roll, the axis of the anvil roll and fly knife roll lying in the same plane and being spaced so that the locus of a cutting point on the cutting edge of the fly knife blade intersects the locus of a corresponding cutting point on the cutting edge of the anvil blade at two points, wherein the improvement comprises mounting the anvil and fly knife blades so that the flexible web traveling on the surface of the anvil roll is cut into sheets through the cooperation of the cutting edge of the fly knife blade with the cutting edge of the anvil blade as the cutting edge of the fly knife blade is traveling away from the center axis of the anvil roll.

2. An improved rotary scissor as recited in claim 1 characterized in that the cutting edge of at least one of said blades is discontinuous whereby the flexible web is perforated.

3. An improved rotary scissor as recited in claim 1 characterized in that the relative path of the cutting point on the fly knife blade with respect to the corresponding cutting point on the anvil blade describes a curtate epitrochoid.

4. An improved rotary scissor as recited in claim 1 characterized in that the relative path of the cutting point on the fly knife blade with respect to the corresponding cutting point on the anvil blade describes a prolate epitrochoid.

* * * * *